Dec. 26, 1961  H. C. RHODES  3,014,451
DEVICE FOR DEPOSITING MATERIAL IN PARTICLE FORM ON
BAKERY PRODUCTS AND THE LIKE
Filed May 9, 1960  2 Sheets-Sheet 2

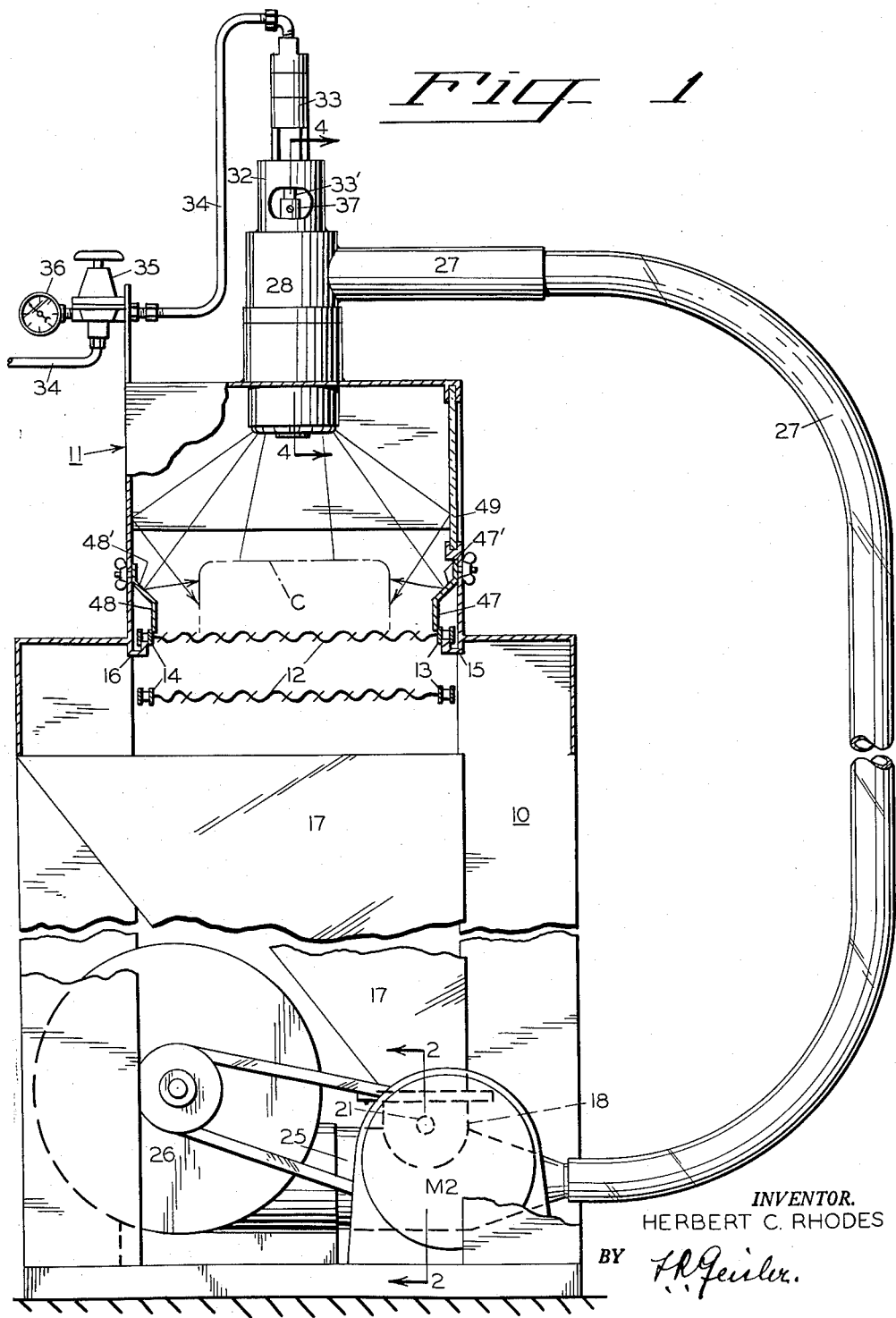

INVENTOR.
HERBERT C. RHODES
BY
ATTORNEY

United States Patent Office 3,014,451
Patented Dec. 26, 1961

3,014,451
DEVICE FOR DEPOSITING MATERIAL IN PARTICLE FORM ON BAKERY PRODUCTS AND THE LIKE
Herbert C. Rhodes, 10106 SE. Stark St., Portland, Oreg.
Filed May 9, 1960, Ser. No. 27,750
2 Claims. (Cl. 118—24)

This invention relates to the depositing of material in particle form, such, for example, as shredded or ground coconut, or chopped or ground nuts, on cakes and similar bakery products, particularly on bakery products which have first been given a coating of frosting or the like to which such particles, when deposited thereon, will adhere.

An object of the invention is to provide an improved device by which such material in comminuted or particle form can be automatically deposited on an article and distributed evenly on such article or over a given area.

Another object of the invention is to provide improved distributing means by which the amount or density of such distribution and deposit within the given area can be adjusted and controlled.

A related object is to provide improved distributing means with which the size of the area in which such distribution takes place can be varied when required.

A further object of the invention is to provide automatic operating means for depositing desired particles on a bakery product by which distribution of the particles being deposited will extend over the sides as well as over the top of such product.

Heretofore difficulties have been encountered with the use of mechanical means for scattering or distributing material in particle form on bakery products when the material in itself is moist, oily or sticky, since the tendency for the particles of such material to stick together frequently interferes with the desired even distribution and furthermore has been found to cause frequent clogging in various distributing means heretofore employed. An additional and important object of the present invention accordingly is to provide a device with a distributing head which will be self-clearing to such extent that no accumulation in or clogging of the distributing head will occur regardless of the nature of the material in particle form which is being distributed.

A still further object is to provide improved means for depositing material in particle form on bakery products in particular which will be simple, practical and economical, and which will not present any appreciable operating or maintenance problem.

The manner in which these objects and incidental advantages are attained with the device of the present invention, and the construction and method of operation of the device, will be readily understood from the following brief description in which reference is to be made to the accompanying drawings.

In the drawings:

FIG. 1 is an elevation of the entire device, with the lower portion foreshortened and with part of the lower frame broken away for clarity;

Figures 4, 6:
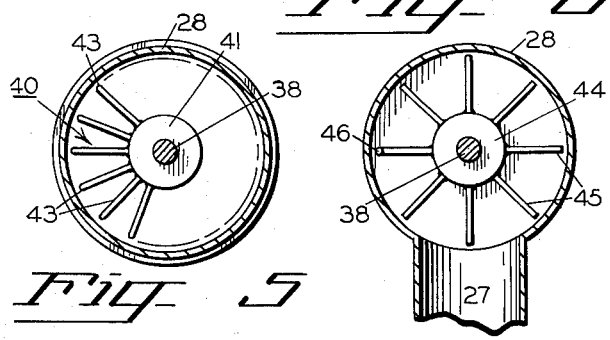
FIG. 4 is a vertical section through the distributor head taken on line 4—4 of FIG. 1 but drawn to a larger scale.
Figure 5:
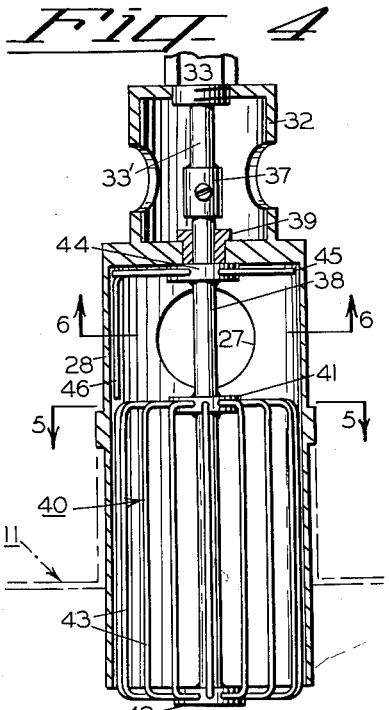
Figure 7:
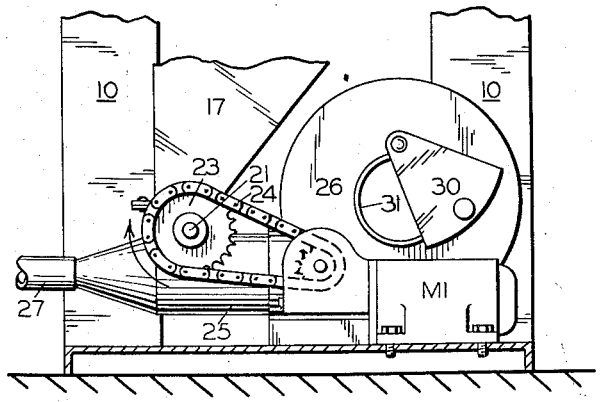

FIGS. 5 and 6 are sections taken on lines 5—5 and 6—6 respectively of FIG. 4; and FIG. 7 is an elevation of the lower portion of the device taken from the side opposite that shown in FIG. 1 and drawn to a smaller scale.

Referring first to FIG. 1, the device includes a lower open frame structure, indicated in general by the reference character 10, on which an upper housing 11 is mounted. The lower frame structure 10 has the top which however is omitted beneath the upper housing 11, and the latter has no bottom wall, the resulting open space at the bottom of the upper housing 11 being occupied by portion of an endless conveyor 12 which is shown in transverse section in FIG. 1. The conveyor 12 comprises a pair of endless chains 13 and 14 which are supported during part of their upper course on tracks 15 and 16 mounted in the top of the structure 10. To form the endless conveyor 12 the chains 13 and 14 are connected by a suitable flexible grating or open mesh material. The conveyor 12 extends over the entire bottom of the upper housing 11 and extends for some distance beyond either side of the device, being supported by and driven by suitable means (not shown). The conveyor carries the articles or bakery products (such as the cake indicated in C in FIG. 1), on which the particle material is to be deposited, through the housing 11, but the flexible grating or open mesh of the conveyor permits the particles of material which drop down in the housing 11 and which do not encounter any article or bakery products moving along on the conveyor 12 to drop down through the conveyor into a storage hopper 17 mounted in the lower frame structure 10.

Figure 3:
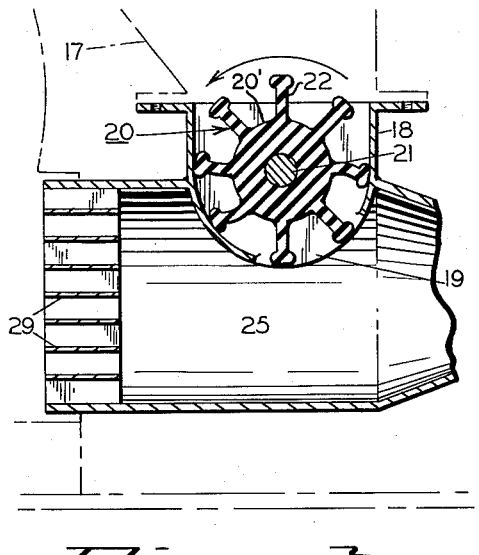
FIG. 3 is a fragmentary section corresponding to line 3—3 of FIG. 2.
Figure 2:
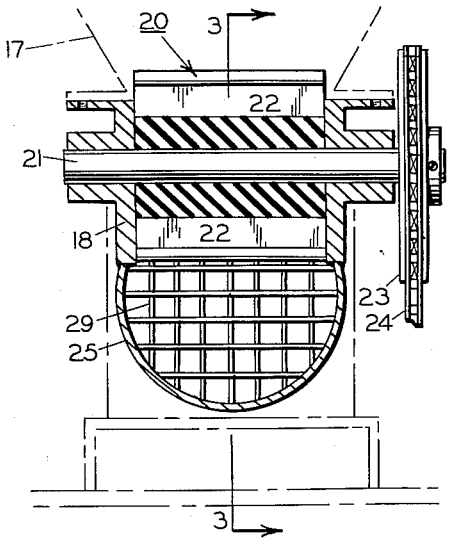
FIG. 2 is a fragmentary section on line 2—2 of FIG. 1 drawn to a larger scale.

The hopper 17, which contains the material in particle form (such as shredded or grated coconut) which is to be deposited on the articles or bakery products moved through the housing 11 on the conveyor 12, discharges into a dispensing receptacle 18 (see also FIG. 3) having a semi-cylindrical bottom wall with an outlet opening 19 arranged as shown. A dispensing paddle wheel 20 (FIGS. 2 and 3) is mounted in the receptacle 18 and has a hub 20' secured on a driven shaft 21. Flexible blades 22 extend radially from the hub 20', and the shaft 21 is mounted for rotation in the end walls of the dispensing receptacle 18. A sprocket 23 (FIGS. 2 and 7), secured on the end of the shaft 21 outside of the dispensing receptacle 18, is connected by a sprocket chain 24 to a suitable reduction gear driven by a motor M1. Slow rotation of the dispensing paddle wheel 20 causes material from the hopper 17 to be discharged from the outlet opening 19 of the dispensing receptacle 18 as required.

The bottom of the dispensing receptacle 18 is set into a venturi feeding or mixing chamber 25 in which the material from the dispensing receptacle 18 is mixed with a continuous charge of air delivered under pressure from a blower 26. The blower 26 discharges into the rear of the mixing chamber 25 and the mixture of particle material and air under pressure is forced through a tube 27 which leads upwardly and which discharges the mixture into the top portion of a distributor head housing 28. This housing 28 contains a distributor head (to be described later) and is supported in the top of the housing 11 (FIG. 1).

The fan in the blower 26 is driven by pulley and belt connections with a motor M2 (shown in FIG. 1). A directional grill 29 (FIGS. 2 and 3) is placed in the connection between the blower 26 and the chamber 25 so that the supply of air under pressure will move in a straight path instead of in a possible rotational path as it passes through the chamber 25 and mixes with the particle material and is then forced through the tube 27. The volume of air discharged from the blower 26 into the chamber 25 and through the tube 27 can be regulated by an adjustable shutter slide 30 (FIG. 7) mounted on the blower over the intake opening 31 for the blower.

The distributor head housing 28 (FIGS. 1 and 4) is cylindrical. It extends a short distance down into the upper housing 11 and the bottom of this distributor head housing is open. A mount 32 (FIG. 1), secured on the top of the distributor head housing 28, supports an air motor 33 which operates a vertical drive shaft 33'. The air motor 33 is connected with a suitable source of compressed air (not shown) through the air line 34. An air control valve 35 and an air pressure indicator 36 in the air line 34 enable the speed of the air motor 33 to be regulated as desired. The drive shaft 33' of the air motor terminates at the bottom in a suitable chuck or socket 37 in which is removably secured the upper end of the shaft 38 of the distributor head. This distributor head is designated as a whole by the reference character 40 and will now be described.

Referring to FIGS. 4, 5 and 6, the distributor head 40 includes the center main shaft 38, which extends up through a suitable bushing or bearing 39 in the top of the distributor head housing 28 with the upper end of this shaft 38 removably secured to the drive shaft 33' of the air motor 33. A pair of collars 41 and 42 are secured on the shaft 38, or formed integral therewith, the collar 42 being at the bottom of the shaft. The upper and lower ends of a series of equally spaced, radially positioned, open blades 43 are secured in these collars respectively. Each of these open blades 43 consists of a rod in bracket shape formation having two parallel ends extending horizontally and radially from the respective mounting collars in which they are secured, the ends connected by a main outer portion. The two parallel horizontal end portions of each blade are of such length that the outer main portion of the blade which joins them will have a slight clearance, for example, one eighth of an inch, with the inside cylindrical wall of the distributor head housing 28. These open bracket shape blades 43 extend down a short distance below the bottom of the distributor head housing 28 as shown in FIG. 4.

The fact that these blades 43 of the distributor head 40 are of such open bracket shape formation, thus leaving a considerable area within the head which is free of the radially mounted blades, is an important feature of the invention. In consequence of the open space within the blades some of the material delivered into the distributor head housing 28 above the blades from the discharging tube 27 will always pass downwardly through the distributor head, and thus be distributed directly downwardly onto the tops of the articles or bakery products passing below the head, regardless of the speed of rotation of the head. If the entire area encompassed by each blade were completely covered, as in the case of ordinary blades, rapid rotation of the head would cause substantially all of the material discharged downwardly onto such rotating solid blades to be thrown against the cylindrical wall of the distributing head housing, causing the impinged material to become congested at the outer edges of the blades and then to be unevenly distributed on the articles or bakery products passing beneath the distributor, and also preventing adequate distribution of the particle material in the area directly below the distributing head. Such difficulties are avoided by the use of the special open blades. Furthermore since these open blades are formed of rods of small diameter, for example, rods of from one eighth of an inch to one quarter of inch in diameter, and since the lower horizontal end portions of the open blades are located slightly below the bottom of the distributor head housing, the rotation of the blades will cause part, but not all, of the particle material to be thrown outwardly as well as downwardly from the bottom of the distributor head housing.

The distance outwardly to which some of the particle material will be projected from the distributor head, and thus the area over which the material is distributed by the distributor head, will be governed largely by the adjustable speed of rotation of the distributor head. However, since there will be no congestion of the material in the distributor head and no clogging on the rotating blades, and since some of the particle material will always pass downwardly through the distributor head, the particle material will be distributed evenly over the area of distribution.

In this device the amount of particle material distributed in a given area at any one time by the distributor head will be influenced by the rate at which such particle material is delivered from the dispensing receptacle 18 (FIGS. 1 and 3) to the feeding chamber 25 (controlled by the adjustable speed at which the paddle wheel 20 is rotated), by the volume and force of the charge of air by which the material is conveyed through the tube 27 to the distributor head (controlled by the speed at which the blower 26 is operated and the amount of air admitted to the blower), and finally, and most important of all, by the adjustable speed at which the distributor head is rotated.

In order to prevent any material delivered into the distributor head housing 28 from the tube 27 from collecting on the top or side wall in the upper portion of the distributor head housing (FIG. 4) the shaft 38 of the distributor head is provided with an additional upper third collar 44, located adjacent the top wall of the distributor head housing 28, in which collar are mounted a series of equally spaced, radial arms 45 (see FIG. 6) which prevent any collection of material on the top wall of this housing. At least one of these radial arms 45 is also provided with a downward extension 46 which extends downwardly adjacent the side wall of the housing almost to the lower blades 43 so as to dislodge any material which otherwise might possibly cling to the side wall in this part of the distributor head housing.

With some bakery products, such as cakes for example, it is desirable to have the coating of particle material applied to the sides as well as to the top. By increasing the rotational speed of the distributor head 40 to the extent that some of the particle material will be thrown against the side walls of the housing 11 (FIG. 1) a considerable portion of the particles striking the side walls of the housing 11 will rebound from the side walls in paths extending downwardly and inwardly, causing some of the particles to strike the sides of the cake. To provide for a greater distribution of material on the sides of the cake a pair of specially shaped baffles 47 and 48 (FIG. 1) are attached to the lower portion of the side walls of housing 11 on the inside. These baffles have top surfaces 47' and 48' respectively which slope inwardly and downwardly and these top surfaces are arranged at such height and with such slope (preferably approximately 45°) that the particles of material striking these surfaces will be deflected to the corresponding sides of the cake.

Due to the fact that there are no broad blade surfaces in the distributor head and that the open blades are formed of rods having a diameter preferably of from one eighth inch to one quarter inch, on which blades any tendency for material to collect is practically eliminated, and to the fact that no material is permitted to collect on the walls of the distributor head housing, there is no problem as far as the keeping of the distributor head clear and clean is concerned, even though oily or sticky particles are being distributed. The force of air through the tube 27 into the distributor head housing 28 and downwardly therefrom will, to a large extent, suffice to keep the distributor head in proper clean condition.

The size of the upper housing 11 should be determined to some degree by the average maximum size of the articles or bakery products on which the particle material is to be deposited. Preferably the housing 11 will have a transparent window in at least one of the walls, such a window being indicated at 49 in FIG. 1, so as to enable the operator to observe more easily the manner in which the distribution of the particle material is taking place and to guide the operator in making whatever operation adjustments may be necessary.

As evident from FIG. 1, the particle material discharged from the distributor head which does not lodge on any articles or bakery products passing through the device, will drop down through the relatively large open spaces in the conveyor 12 into the hopper 17 below and thus be available for further use.

Minor modifications in the device would be possible without departing from the principle of the invention. For example, an electric motor, in place of an air motor, could be used for rotating the distributor head at desired adjustable speeds. However the device constructed as described has proved very satisfactory and accordingly the foregoing description is regarded as setting forth the preferred means for carrying out the invention.

I claim:

1. A device for distributing and depositing material in particle form including a distributor head having a main shaft supported for rotation on a substantially vertical axis, a motor rotating said shaft at desired adjustable speed, a distributor head housing having a cylindrical wall co-axial with said shaft, said housing being open at the bottom, a plurality of equally spaced open blades mounted on said shaft, each of said blades consisting of a rod formed substantially into bracket shape having upper and lower parallel end portions secured to and extending substantially radially from said shaft and joined by a vertical outer main portion having a slight clearance with said cylindrical wall of said housing, said blades extending a short distance below said housing, means for delivering particle material mixed with air under pressure into said housing above said blades, and means for moving articles, desired for receiving a deposit of the particle material, beneath said housing.

2. In a device for distributing and depositing material in particle form, a hopper, an air mixing chamber below said hopper, means for delivering air under pressure into said chamber, means for delivering particle material from said hopper into said chamber, a distributor head housing, a distributor head in said distributor head housing, said distributor head having a main shaft supported for rotation on a substantially vertical axis, a motor for rotating said shaft at desired adjustable speed, said distributor head housing having a cylindrical wall open at the bottom co-axial with said shaft, a plurality of open blades mounted on said shaft, each of said blades consisting of a rod formed substantially into bracket shape having upper and lower end portions secured to and extending substantially radially from said shaft and joined by an outer main portion having a slight clearance with said cylindrical wall of said distributor head housing, a tube leading from said mixing chamber to the upper portion of said distributor head housing above said blades, said blades extending a short distance below said distributor head housing, and means for moving articles, desired for receiving a deposit of the particle material, beneath said housing.

References Cited in the file of this patent

UNITED STATES PATENTS

| | | |
|---|---|---|
| 1,659,179 | Wilson | Feb. 14, 1928 |
| 2,109,205 | Woodward | Feb. 22, 1938 |
| 2,503,233 | Hall | Apr. 4, 1950 |
| 2,839,111 | Mitchell | June 17, 1958 |